Sept. 12, 1961 R. A. ABLER ET AL 2,999,448
DUST FREE WORK BENCH APPARATUS
Filed March 6, 1958 3 Sheets-Sheet 1
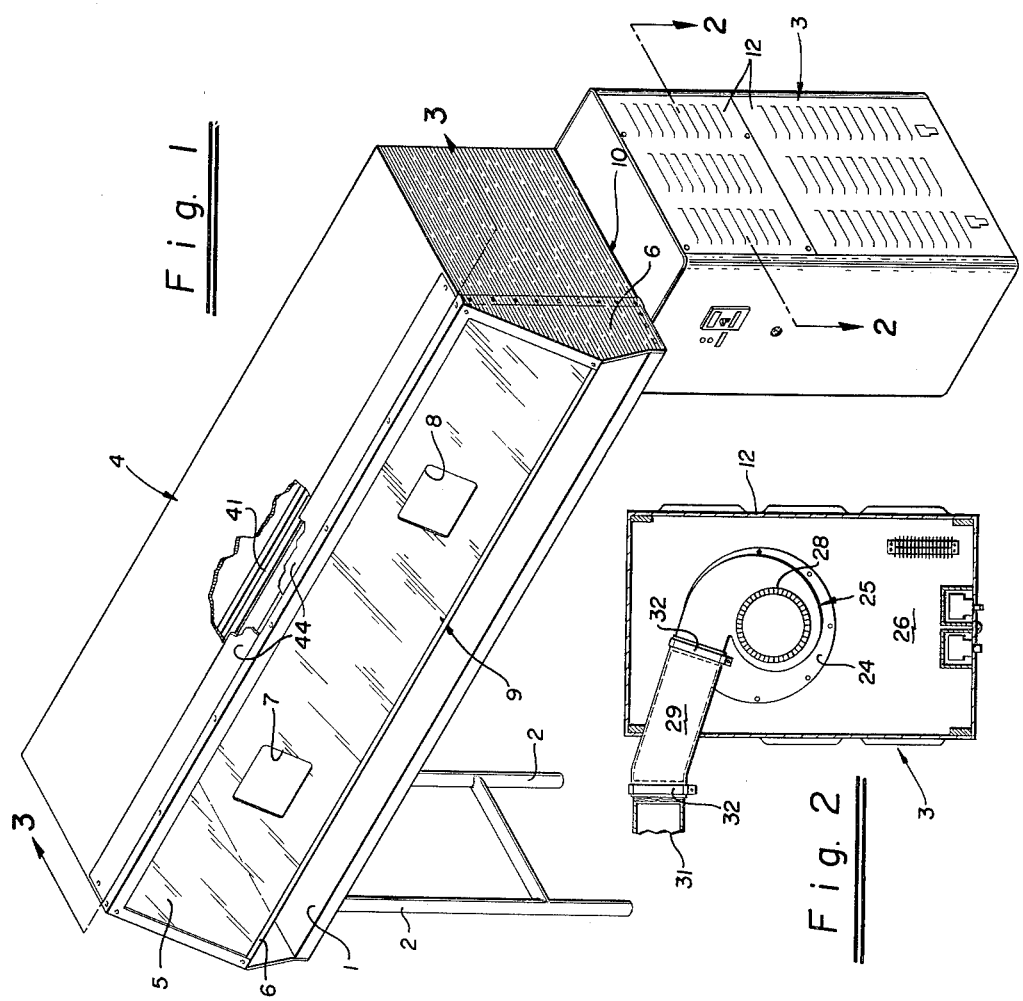
INVENTORS
Robert Abler
Floyd L. Becker
David G. Clifford
BY
Paul B. Hunter
Attorney

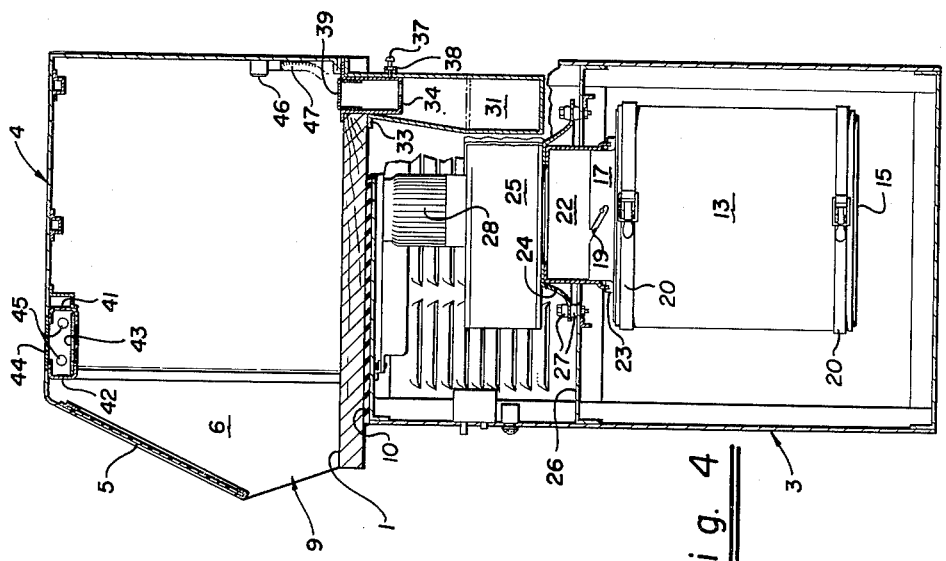
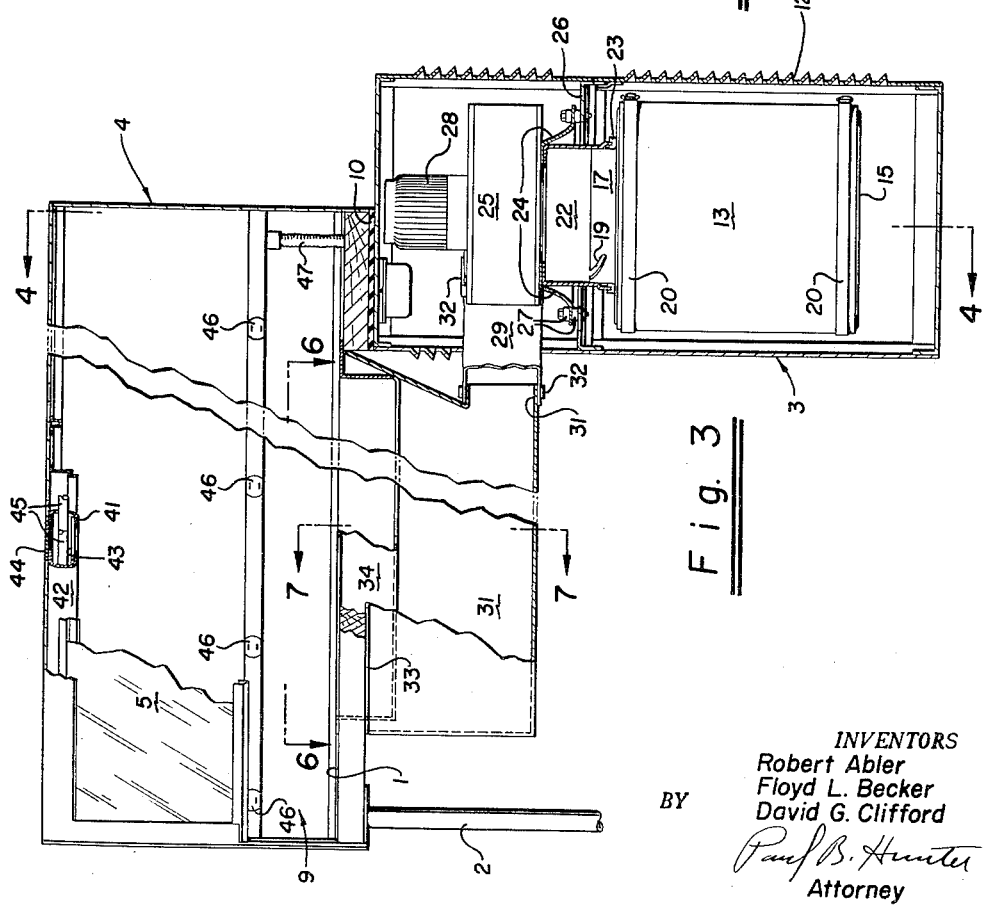

Sept. 12, 1961     R. A. ABLER ET AL     2,999,448
DUST FREE WORK BENCH APPARATUS
Filed March 6, 1958     3 Sheets-Sheet 3
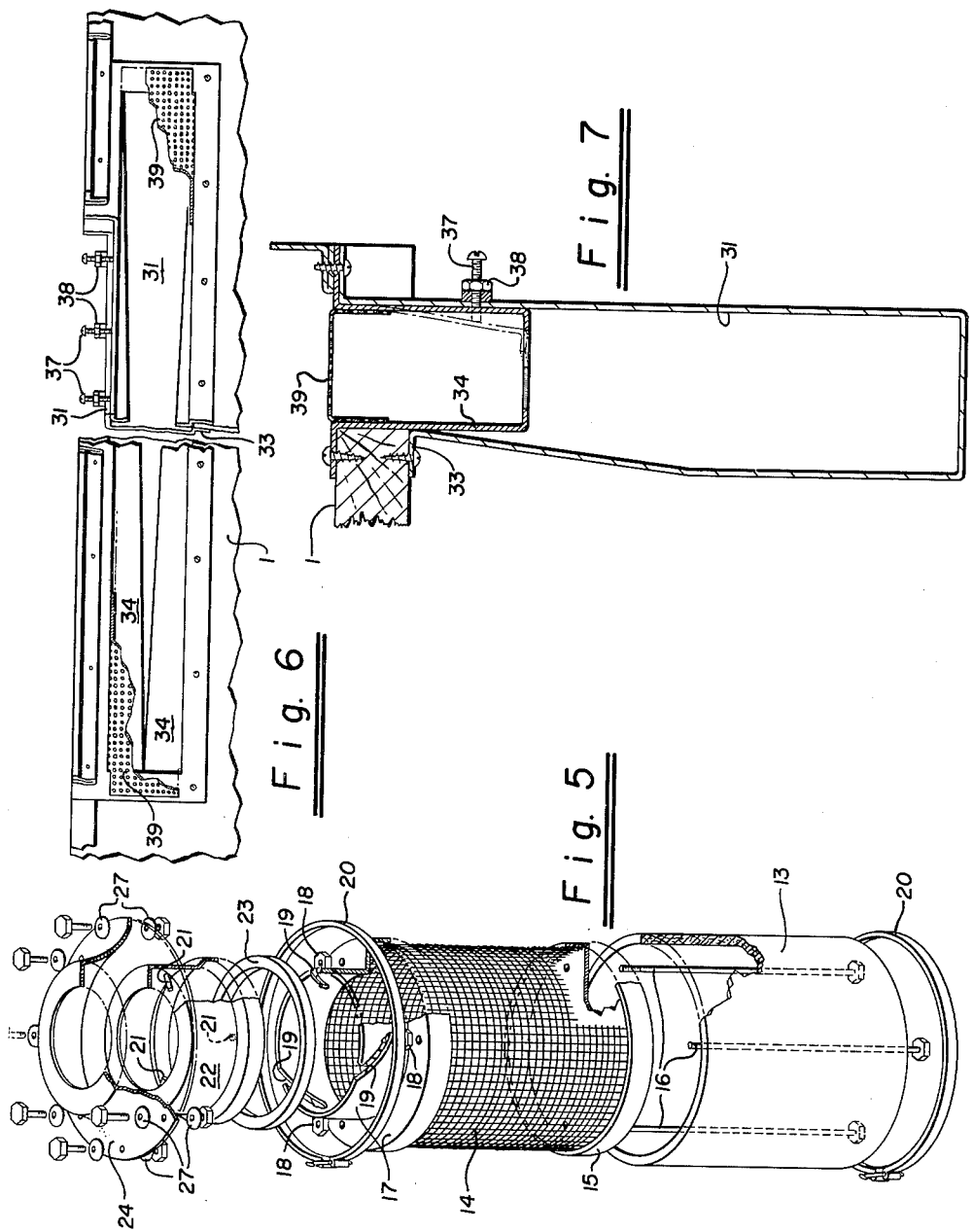
INVENTORS
Robert Abler
Floyd L. Becker
David G. Clifford
BY *Paul B. Hunter*
Attorney

United States Patent Office 2,999,448
Patented Sept. 12, 1961

2,999,448
DUST FREE WORK BENCH APPARATUS
Robert A. Abler, Los Altos, and Floyd L. Becker and David G. Clifford, Palo Alto, Calif., assignors to Varian Associates, Palo Alto, Calif., a corporation of California
Filed Mar. 6, 1958, Ser. No. 721,077
4 Claims. (Cl. 98—115)

The present invention relates in general to dust free work bench apparatus and more specifically to a novel work bench having a partially enclosed working area thereon and supplied, in use, with a substantially constant flow of filtered air whereby undesired dust particles are prevented from entering the working area and contaminating the materials that are being worked upon. Such a dust free work bench is especially useful in the assembly and construction of devices that require an extremely high degree of cleanliness such as, for example, vacuum tubes, semi-conductor devices, ball bearing assemblies and many other intricate devices.

The principal object of the present invention is to provide a novel improved dust free work bench.

One feature of the present invention is the provision of a novel physical bench configuration adapted for modular assembly whereby a plurality of identical dust free work benches may be assembled to form a line and wherein the floor space consumed by the line of work benches having a given working area is minimized.

Another feature of the present invention is the provision of a novel dust free work bench partially enclosed by a cabinet, said cabinet having a top portion forming an external shelf for holding working materials and the like.

Another feature of the present invention is the provision of a resilient sleeve interconnecting the air duct supplying air to the enclosing cabinet, and the air blower, said resilient sleeve absorbing undesired mechanical vibrations produced by the blower and thereby preventing them from being transmitted via the duct to the working area.

Another feature of the present invention is the provision of a novel rapidly replaceable large capacity air filter, for filtering undesired particles from the air before it is discharged into the working area.

Another feature of the present invention is the provision of a shock mounted blower assembly whereby undesired vibrations produced in the motor and blower sections are not transmitted to the dust free working area.

Another feature of the present invention is the provision of a tapered air distribution slot for providing even air flow into the enclosed dust free work bench throughout the length thereof.

Another feature of the present invention is the provision of a sealed light housing accessible from the outside of the work bench enclosure whereby light fixtures may be replaced without contaminating the working area.

Other features and advantages of the present invention will become apparent after a perusal of the specification taken in connection with the accompanying drawings wherein, FIG. 1 is a perspective view partly cut away of the novel dust free work bench of the present invention, FIG. 2 is a cross sectional view of a portion of the structure of FIG. 1 taken along line 2—2 in the direction of the arrows, FIG. 3 is an enlarged shortened cross sectional view of a portion of the structure of FIG. 1 taken along line 3—3 in the direction of the arrows, FIG. 4 is a cross sectional view of a portion of the structure of FIG. 3 taken along line 4—4 in the direction of the arrows, FIG. 5 is an exploded perspective view of the novel air filter assembly of the present invention, FIG. 6 is an enlarged cross sectional view of a portion of the structure of FIG. 3 taken along line 6—6 in the direction of the arrows, and FIG. 7 is an enlarged cross sectional view of a portion of the structure of FIG. 3 taken along line 7—7 in the direction of the arrows.

Referring now to FIG. 1 there is shown in perspective view the novel dust free work bench of the present invention. A table top 1 having a smooth dust free surface such as that formed, for example, by Formica bound wood forms the working surface. The table top 1 is supported at one end via legs 2 and at the other end via a filter housing 3. Shock absorbing pads 10 as of, for example, rubber are disposed between the housing 3 and the table 1 for absorbing mechanical vibrations tending to be transmitted from the filter housing 3 to the table 1, in use. The table 1 is partially enclosed via a dust free cabinet 4 as of, for example, sheet metal. The legs 2 may be removed from the table to facilitate assembly of a number of the dust free work benches into a line. More specifically the free end portion of a first table 1 may be rested upon the top of the filter housing 3 of a second dust free work bench assembly thereby facilitating modular assembly of the units. When the units are assembled in such a line the dust free working area forms substantially a continuous line without interruption thereby maximizing utilization of the available floor space.

The dust free cabinet 4 is provided with a flat top thereon to form a shelf for storage of materials which may be utilized during the construction process. The dust free cabinet 4 is partially closed off on one side thereof via an apertured transparent partition 5 as of, for example, Plexiglas. The transparent partition 5 is carried within a suitable frame member 6 which in turn is fixedly secured to the table 1 and to the dust free cabinet 4 as by, for example, a plurality of sheet metal screws. The transparent partition 5 is carried at a substantial angle to the vertical as of, for example, 45° to permit easy viewing of the work area and access thereto. The transparent partition 5 is apertured at 7 and 8 to permit equipment such as, for example, microscopes utilized in the assembly process or in the work area to extend outwardly thereof. A long narrow opening 9, defined by the area between the table 1 and the bottom portion of the transparent partition 5, permits easy access to the dust free work area by the operator.

In operation air enters the filter housing 3 via louvered side walls thereof and thence is filtered and fed into the dust free cabinet 4 via a screened duct extending longitudinally of and at the back of the table 1. The filtered air emerges from the duct and flows into the cabinet 4. Air which enters the dust free cabinet 4 flows outwardly therefrom through openings 7, 8 and 9. The amount of air which is supplied to the dust free cabinet is regulated such that the air escape velocity flowing outwardly of the dust free cabinet 4 is approximately 60 to 70 feet per minute. It has been found that higher air velocities such as, for example, 100 feet per minute will provide a slightly cleaner cabinet, however the higher air escape velocities produce discomfort to the operator.

Referring now to FIGS. 2, 3, 4, 5 and 6 the filtered air supply system will be more fully described. Air is drawn into the filter housing 3 via removable louvered plates 12 and thence through a filter canister including a filter element 13 as of, for example, half inch fiber glass which is commercially available as Aerocore PF–105 and is manufactured by Owens-Corning Glass Co. The filter element 13 is carried upon a hollow cylindrical screen mesh 14 which at its lower end fits coaxially of and internally of a flanged end plate 15. The end plate carries three bolts 16 coaxially within the filter element 13 and screen 14. The free end portions of the bolts 16 extend through apertures suitably placed in a male twist lock adapter 17. The hollow cylindrical screen 14 abuts, at its upper edge, the male twist lock adapter 17 which has a flanged portion thereof circumscribing the upper extremity of the screen 14. Nuts 18 are threaded on the free end portions of the bolts 16 for tightly holding the end plate 15 in position with respect to the spaced apart male twist lock adapter 17. Two circular pressure bands 20 having quick coupling fittings circumscribe the filter element 13 at the top and bottom ends thereof for holding the filter element 13 tightly against the flanged end plate 15 and flanged male twist lock adapter 17.

The cylindrical free end portion of the male twist lock adapter 17 is provided with a plurality of twist lock slots 19 for engaging a plurality of radially extending pins 21 carried upon the inner surface of a female twist lock adapter 22. A circular rubber gasket 23 is carried coaxially of and externally to the male twist lock adapter 17 for engagement with the lower free end portion of the female twist lock adapter 22.

The filter canister assembly is locked in position by producing engagement of the twist lock slots 19 with the pins 21 and turning the filter canister assembly in a clockwise direction whereby the male twist lock adapter 17 is pulled tightly against the female twist lock adapter 22 and thereby seating the lower free end portion of the female twist lock adapter 22 against the rubber gasket 23 to produce an air tight seal therebetween. A horizontal portion is provided in the twist lock slot 19, at the lower extremity of the slot, to provide a recess for the pin 21 whereby the filter canister assembly is locked in position when the pin 21 rides into this portion of the slot 19.

The female twist lock adapter 22 is provided with an inwardly extending flange at its uppermost portion for mating with a flanged portion of a flared blower adapter 24. The blower adapter 24 and female twist lock adapter 22 are fixedly carried from a blower housing 25 via the intermediary of a plurality of screws, not shown.

The blower housing 25 is carried from a centrally apertured partition 26 extending transversely of the filter housing 3 via the intermediary of the flared blower adapter 24. The blower adapter 24 is shock mounted upon the transverse partition 26 via the intermediary of a plurality of bolts and rubber grommets 27. The blower housing 25 contains therewithin a centrifugal blower such as, for example, a Rotron driven via a hermetically sealed motor 28 carried upon the blower housing 25. The rubber grommets 27 serve to prevent unwanted shock and vibration produced in the blower and motor assembly from being transmitted to the table 1.

The output of the blower contained within the blower housing 25 is fed via an elastic sleeve 29 interconnecting the blower housing 25 and a rectangular air duct 31. The elastic sleeve 29 as of, for example, rubber is fixedly secured to the blower housing 25 and rectangular air duct 31 via two flexible and resilient metal bands 32 as of, for example, steel strapping. The elastic sleeve 29 serves to absorb mechanical vibration produced in the blower 25 thereby preventing such vibration from being transmitted via the duct 31 to the table 1. The air duct 31 is open at the uppermost side thereof and is provided at its open side with a flange 33 for securing to the underside of the table 1 via a plurality of screws, not shown.

The open side of the rectangular air duct 31 is partially closed off via a rectangular air diffusion canister 34. The air diffusion canister 34 is shown in enlarged cross sectional view in FIG. 7. The canister 34 is open along the top side thereof and has a smaller opening or slot in the bottom wall. The bottom wall of the air diffusion canister 34 is shown in cross sectional view in FIG. 6 wherein it can be seen that the slot is triangular shaped. In a preferred embodiment of the present invention the slot is approximately ¾ of an inch in width at the wide end thereof and is approximately 6 feet long. The wide end of the slot is disposed in close proximity to the blower end of the rectangular air duct 31. The triangular configuration of the slot is for the purpose of obtaining substantially uniform air flow from the rectangular air duct 31 into the dust free cabinet 4 throughout the length of the cabinet 4. Air entering the duct 31 from the blower 25 dams up at the far end of the duct 31 producing a higher pressure at the far end and lower pressure at the blower end of the duct. The vertex end of the slot is disposed at the far end of the duct 31 so that the width of the slot increases with pressure drop such that more slot cross section is available where pressure is low thereby obtaining even distribution of the air from the duct 31 into the cabinet 4.

A plurality of adjusting screws 37 are threaded through tapped holes in the side wall of the rectangular air duct 31 and bear at their innermost end against the side wall of the air diffusion canister 34. Lock nuts 38 are provided on the adjusting screws 37 for locking them in position. Adjustment of the air flow between the rectangular air duct 31 and the dust free cabinet 4 may be obtained by turning the adjusting screws 37 to apply more or less pressure to the side wall of the air diffusion canister 34 and thus produce more or less distortion of the thin side wall of the air diffusion canister 34 resulting in either opening or closing the triangular slot in the bottom thereof. A light gage metallic screen 39 is fixedly secured over the open side of the rectangular air diffusion canister 34 and serves to provide a combined supporting surface, screen, and air diffuser.

Referring now to FIGS. 1, 3 and 4 there is shown the sealed light housing feature of the present invention. More specifically two channels 41 and 42 are disposed in mutually opposing spaced apart relationship and fixedly secured longitudinally of the dust free cabinet 4 along the frontal portion of the top wall thereof. A transparent window 43 as of, for example, glass is sealed over the opening in the bottom portion of the light housing, formed by the two channel members 42 and 41. The top open side of the light housing is covered over by a flush mounted light housing cover 44 which may be removed, when desired, to replace fluorescent lighting tubes 45 contained within the sealed light housing without the necessity of entering the partially enclosed dust free working area.

A plurality of power outlets are provided on the back vertical wall of the dust free cabinet 4. The power outlets 46 are supplied via a shielded power cable 47 which is connected via a switch to a suitable power source, not shown.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A dust free work bench apparatus adapted for modular assembly including, a first partially enclosed dust free table for supporting the work, a housing structure adapted to be supported on a floor, an air blower contained within said housing structure for blowing air into said partially enclosed table in use, said housing structure adapted to support said first table at substantially one end thereof, and said housing structure disposed substantially entirely below the level of said table and adapted to also support an adjoining second substantially identical dust free work bench at the end of said second work bench remote from its housing structure whereby a plurality of dust free work benches may be assembled into a line while obtaining maximum floor space utilization.

2. A dust free work bench apparatus including, a table, a cabinet partially enclosing the top of said table, an air blower for supplying air to said cabinet, an air duct disposed below said table and interconnecting said blower and said cabinet for distributing the air to said cabinet, and said air duct having an elastic side wall portion thereof for absorbing undesired mechanical vibration and air pulsations applied thereto, whereby undesired vibration produced by said air blower is prevented from being transmitted to said table via said air duct.

3. A dust free work bench apparatus including, a table, a cabinet partially enclosing the top of said table, an air blower for supplying air to said cabinet, an air filter canister for filtering the air supplied to said blower, an air duct disposed substantially entirely below said table and extending lengthwise of said table and cabinet and interconnecting said blower and said cabinet for distributing the air to said cabinet, said air duct having a slot therein extending lengthwise of said air duct for determining the degree of air communication between said air duct and said cabinet, the slot in said duct having a tapered width over the length thereof whereby even air distribution to said cabinet is obtained longitudinally of said cabinet; and an exhaust port for exhausting air from said cabinet through which said port the operator inserts his hands for work in said dust free cabinet.

4. A dust free work bench apparatus including, a first table, a cabinet partially enclosing the top of said first table, said cabinet forming a shelf extending substantially the entire length of said first table and having a width substantially greater than one half the width of said first table whereby materials may be stored externally of said dust free cabinet as desired, a blower for supplying air to said cabinet, a substantially cylindrical filter canister for filtering the air supplied to said blower, an air duct extending lengthwise of said first table disposed below said first table and interconnecting said blower and said cabinet for distributing air to said cabinet, said air duct having an elastic wall portion thereof for absorbing undesired mechanical vibration applied thereto, said air duct being disposed in the bottom and rear of said cabinet and opening upwardly and having a tapered air distribution slot communicating between said cabinet and said air duct for providing even air flow distribution longitudinally of said table, a housing structure adapted to be supported on a floor and enclosing said blower and said filter canister and disposed substantially entirely below the level of said first table, a shock absorbing assembly disposed between said blower and said housing structure for absorbing undesired vibration produced by said blower, said housing structure adapted to support said first table at substantially one end thereof and said housing structure adapted to support an adjoining second substantially identical dust free work bench at the respective other end thereof, and an externally accessible sealed light housing fixedly secured to said cabinet and extending longitudinally thereof to permit replacement of light fixtures without contaminating the dust free area.

References Cited in the file of this patent

UNITED STATES PATENTS

| | | |
|---|---|---|
| 1,892,415 | Ulrich | Dec. 27, 1932 |
| 2,214,737 | Dauphinee | Sept. 17, 1940 |
| 2,310,414 | Fritzam | Feb. 9, 1943 |
| 2,348,455 | Daudelin | May 9, 1944 |
| 2,709,954 | Baker | June 7, 1955 |
| 2,715,359 | Mackintosh | Aug. 16, 1955 |
| 2,810,453 | Kemnitz | Oct. 22, 1957 |

FOREIGN PATENTS

| | | |
|---|---|---|
| 1,737 | Great Britain | Jan. 20, 1900 |